United States Patent
Tsukahara (10) Patent No.: US 9,284,883 B2
(45) Date of Patent: Mar. 15, 2016

(54) SIX-STROKE CYCLE ENGINE HAVING SCAVENGING STROKE

(71) Applicant: YAMAHA HATSUDOKI KABUSHIKI KAISHA, Iwata-shi, Shizuoka (JP)

(72) Inventor: Ei Tsukahara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 78 days.

(21) Appl. No.: 14/374,598

(22) PCT Filed: Jan. 16, 2013

(86) PCT No.: PCT/JP2013/050642
§ 371 (c)(1),
(2) Date: Jul. 25, 2014

(87) PCT Pub. No.: WO2013/111648
PCT Pub. Date: Aug. 1, 2013

(65) Prior Publication Data
US 2014/0366819 A1    Dec. 18, 2014

(30) Foreign Application Priority Data
Jan. 27, 2012    (JP) ................. 2012-014975

(51) Int. Cl.
| F02M 25/07 | (2006.01) |
| F02B 75/02 | (2006.01) |
| F02B 25/14 | (2006.01) |
| F02D 13/02 | (2006.01) |
| F02M 23/00 | (2006.01) |
| F02M 35/108 | (2006.01) |

(Continued)

(52) U.S. Cl.
CPC ............. *F02B 75/021* (2013.01); *F02B 25/145* (2013.01); *F02D 13/0276* (2013.01);

(Continued)

(58) Field of Classification Search
CPC .. F02B 75/021; F02B 25/145; F02B 29/0406; F02B 47/08; F02M 25/0752; F02M 23/006; F02M 35/1085; F02D 13/0276; Y02T 10/18; Y02T 10/121
USPC .......................................................... 123/64
See application file for complete search history.

(56) References Cited

U.S. PATENT DOCUMENTS 4,024,823 A * 5/1977 Ward et al. ..................... 172/4.5
8,186,334 B2    5/2012 Ooyama (Continued)

FOREIGN PATENT DOCUMENTS

EP    1 249 593 A2    10/2002
EP    2 053 214 A1    4/2009

(Continued)

OTHER PUBLICATIONS

Official Communication issued in corresponding European Patent Application No. 13740654.2, mailed on Oct. 30, 2014.

(Continued)

*Primary Examiner* — Marguerite McMahon
(74) *Attorney, Agent, or Firm* — Keating and Bennett, LLP (57) ABSTRACT

A six-stroke cycle engine includes an intake passage including a throttle valve, and an exhaust passage including a catalyst. The six-stroke cycle engine includes a scavenging passage including a first end defined by a scavenging port and a second other end connected to the intake passage upstream of the throttle valve. The six-stroke cycle engine includes an intake valve, an exhaust valve, a scavenging valve, and a valve gear configured to operate these valves. The valve gear closes the scavenging valve and operates the intake valve and the exhaust valve so as to execute an intake stroke, a compression stroke, an expansion stroke, and an exhaust stroke, in this order. The valve gear also operates only the scavenging valve so as to execute a scavenging intake stroke and a scavenging exhaust stroke, in this order, following the exhaust stroke.

6 Claims, 9 Drawing Sheets

(51) Int. Cl.
*F02B 29/04* (2006.01)
*F02B 47/08* (2006.01)

(52) U.S. Cl.
CPC ......... *F02M23/006* (2013.01); *F02M 25/0752* (2013.01); *F02M 35/1085* (2013.01); *F02B 29/0406* (2013.01); *F02B 47/08* (2013.01); *F02M 25/0727* (2013.01); *Y02T 10/121* (2013.01); *Y02T 10/18* (2013.01)

(56) References Cited

U.S. PATENT DOCUMENTS

2004/0173170 A1  9/2004  Gaessler et al.
2010/0050963 A1* 3/2010  Ooyama ........................ 123/64

FOREIGN PATENT DOCUMENTS

| JP | 02-096435 U | 8/1990 |
| JP | 03-030539 U | 3/1991 |
| JP | 09-273430 A | 10/1997 |
| JP | 2006-250029 A | 9/2006 |
| JP | 2007-303303 A | 11/2007 |
| JP | 2010-209683 A | 9/2010 |
| WO | 02/50406 A1 | 6/2002 |
| WO | 20081020550 A1 | 2/2008 |

OTHER PUBLICATIONS

Official Communication issued in International Patent Application No. PCT/JP20131050642, mailed on Feb. 12, 2013.

* cited by examiner

SIX-STROKE CYCLE ENGINE HAVING SCAVENGING STROKE

BACKGROUND OF THE INVENTION

1. Field of the Invention

The present invention relates to a six-stroke cycle engine that includes a scavenging stroke and executes an intake stroke, a compression stroke, an expansion stroke, an exhaust stroke, a scavenging intake stroke, and a scavenging exhaust stroke, in this order.

2. Description of the Related Art

As an engine capable of lowering the cylinder temperature, there is conventionally known a six-stroke cycle engine including a scavenging stroke (scavenging intake stroke and scavenging exhaust stroke) after an exhaust stroke. "Scavenging" of the scavenging stroke means an operation of replacing the gas in the cylinder. In this specification, the scavenging intake stroke indicates a stroke of supplying air into the cylinder to replace the gas in the cylinder. The scavenging exhaust stroke indicates a stroke of discharging air from the cylinder to replace the gas in the cylinder.

In a conventional six-stroke cycle engine, when fresh air is supplied into the cylinder in the scavenging intake stroke, the wall surface of the cylinder is cooled, and the temperature of the cylinder is lowered. When the temperature of the cylinder is lowered, the compression ratio can be made high, and the fuel efficiency or output can be improved. In addition, the ignition timing can be advanced, and the output at the time of high speed rotation can be improved. Furthermore, since the fresh air remains in the cylinder after the scavenging exhaust stroke, the intake volumetric efficiency can be improved in the next intake stroke.

In the six-stroke cycle engine of this type, however, since fresh air is discharged to the exhaust passage in the scavenging exhaust stroke, the following problems arise. More specifically, an oxygen density detected by an $O_2$ sensor provided in the exhaust passage greatly increases, and correct execution of air-fuel ratio control becomes impossible. In addition, since a large quantity of oxygen is supplied to the catalyst provided in the exhaust passage, oxidation reaction excessively occurs in the catalyst. Hence, the temperature of the catalyst abruptly rises, and NOx cannot be reduced.

To solve these problems, an arrangement for returning air in the cylinder to an intake passage in the scavenging exhaust stroke, as described in, for example, Japanese Patent Laid-Open No. 2010-209683, may be used.

A six-stroke cycle engine disclosed in Japanese Patent Laid-Open No. 2010-209683 includes a scavenging passage that communicates a combustion chamber with an intake passage, and a scavenging valve that opens and closes the scavenging passage. In this six-stroke cycle engine, an intake valve opens to supply fresh air into the cylinder in the scavenging intake stroke, and the scavenging valve opens to discharge the air in the cylinder to the intake passage in the scavenging exhaust stroke. That is, in this six-stroke cycle engine, since no fresh air is discharged to the exhaust passage in the scavenging exhaust stroke, the above-described problems do not arise.

SUMMARY OF THE INVENTION

In the six-stroke cycle engine disclosed in Japanese Patent Laid-Open No. 2010-209683, however, since the intake valve opens to pass intake air through a throttle valve in the scavenging intake stroke, pumping loss cannot be reduced.

Preferred embodiments of the present invention have been conceived to solve the above-described problems, and provide a six-stroke cycle engine configured to reduce pumping loss while preventing fresh air from being discharged to an exhaust passage in the scavenging exhaust stroke.

According to a preferred embodiment of the present invention, a six-stroke cycle engine having a scavenging stroke includes an intake passage including a throttle valve and a downstream end defined by an intake port open to a combustion chamber, an exhaust passage including a catalyst and an upstream end defined by an exhaust port open to the combustion chamber, a scavenging passage including a first end defined by a scavenging port open to the combustion chamber and a second end connected to the intake passage upstream of the throttle valve, an intake valve configured to open and close the intake port, an exhaust valve configured to open and close the exhaust port, a scavenging valve configured to open and close the scavenging port, and a valve gear configured to operate the intake valve and the exhaust valve so that an intake stroke, a compression stroke, an expansion stroke, and an exhaust stroke are executed, in this order, in a state in which the scavenging valve is closed, and to operate only the scavenging valve in a state in which the intake valve and the exhaust valve are closed so that a scavenging intake stroke and a scavenging exhaust stroke are executed, in this order, following the exhaust stroke.

According a preferred embodiment of the present invention, in the scavenging intake stroke, the scavenging valve opens, and fresh air is inhaled from the intake passage upstream of the throttle valve into the cylinder via the scavenging passage. The resistance generated when air flows through the scavenging passage is much smaller than the resistance generated when air flows through the intake passage and the throttle valve. For this reason, the six-stroke cycle engine reduces pumping loss in the scavenging intake stroke. In the scavenging exhaust stroke, the air in the cylinder is returned to the intake passage via the scavenging passage.

Hence, according to a preferred embodiment of the present invention, it is possible to provide a six-stroke cycle engine configured to reduce pumping loss while preventing fresh air from being discharged to an exhaust passage in the scavenging exhaust stroke.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A six-stroke cycle engine including a scavenging stroke according to a preferred embodiment of the present invention will now be described in detail with reference to FIGS. 1 and 2.

Figure 1:
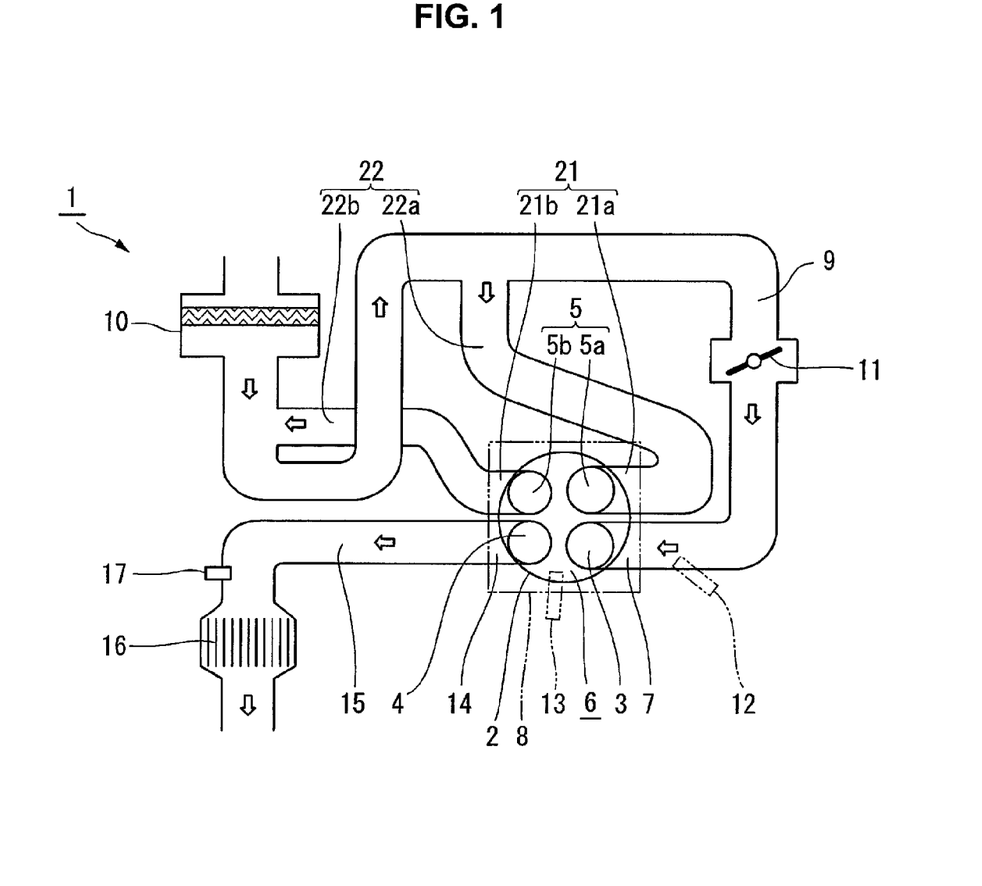
FIG. 1 is a block diagram showing the arrangement of a six-stroke cycle engine according to a first preferred embodiment of the present invention.
Figure 2:
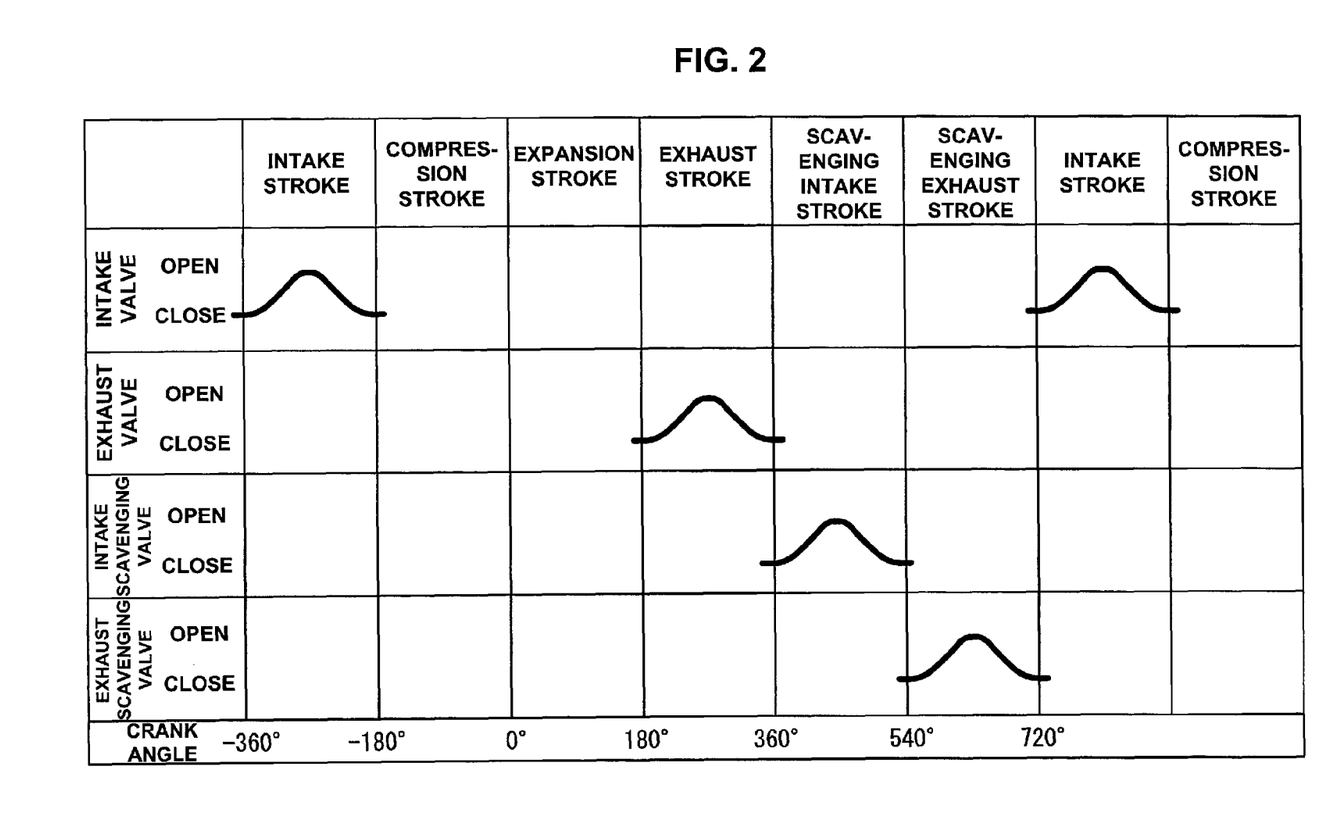
FIG. 2 is a timing chart showing valve opening and closing timings.

A six-stroke cycle engine 1 shown in FIG. 1 includes an intake valve 3, an exhaust valve 4, and a scavenging valve 5 in one cylinder 2. FIG. 1 illustrates only one cylinder 2. However, preferred embodiments of the present invention are applicable not only to a single cylinder engine but also to a multiple cylinder engine.

The intake valve 3 opens and closes an intake port 7 open to a combustion chamber 6. One intake valve 3 is provided for the cylinder 2, for example. The intake valve 3 operates by driving of a valve gear 8 (to be described below). The intake port 7 defines the downstream end of an intake passage 9. The upstream end of the intake passage 9 is open to the atmosphere via an air cleaner 10. A throttle valve 11 is provided in the intake passage 9. The fuel for the six-stroke cycle engine 1 is supplied by an intake passage injector 12 provided on the downstream side of the throttle valve 11 in the intake passage 9, or a cylinder injector 13 provided on the side of the cylinder 2.

The exhaust valve 4 opens and closes an exhaust port 14 open to the combustion chamber 6. One exhaust valve 4 is provided for the cylinder 2, for example. The exhaust valve 4 operates by driving of the valve gear 8 (to be described below). The exhaust port 14 defines the upstream end of an exhaust passage 15. A catalyst 16 is provided in the exhaust passage 15. The catalyst 16 is preferably a so-called three-way catalyst, for example. An A/F sensor 17 configured to detect the oxygen density in the exhaust passage 15 is provided on the upstream side of the catalyst 16 in the exhaust passage 15.

The scavenging valve 5 opens and closes a scavenging port 21 open to the combustion chamber 6. The scavenging port 21 defines an end of a scavenging passage 22 extending from the intake passage 9. The scavenging port 21 according to the present preferred embodiment includes a scavenging intake port 21a and a scavenging exhaust port 21b. The scavenging passage 22 according to the present preferred embodiment includes an intake scavenging passage 22a including a downstream end defined by the scavenging intake port 21a, and an exhaust scavenging passage 22b including an upstream end defined by the scavenging exhaust port 21b. The upstream end of the intake scavenging passage 22a is connected to the intake passage 9 upstream of the throttle valve 11. The downstream end of the exhaust scavenging passage 22b is connected to the intake passage 9 upstream of the throttle valve 11.

The scavenging valve 5 according to the present preferred embodiment includes an intake scavenging valve 5a that opens and closes the scavenging intake port 21a, and an exhaust scavenging valve 5b that opens and closes the scavenging exhaust port 21b. The intake scavenging valve 5a is located at a position adjacent to the intake valve 3 in the axial direction (up/down direction in FIG. 1) of a crankshaft (not shown). The exhaust scavenging valve 5b is located at a position adjacent to the exhaust valve 4 in the axial direction of the crankshaft. The intake scavenging valve 5a and the exhaust scavenging valve 5b operate by driving of the valve gear 8 (to be described below).

The valve gear 8 converts the rotation of a camshaft into a reciprocating motion by a cam and transmits it to the valves, although details thereof are not illustrated. The valve gear 8 operates the valves so as to sequentially execute six strokes (to be described below) as shown in FIG. 2. The six strokes are an intake stroke, a compression stroke, an expansion stroke, an exhaust stroke, a scavenging intake stroke, and a scavenging exhaust stroke.

In the intake stroke, the valve gear 8 opens and closes only the intake valve 3. After the compression stroke and the expansion stroke after the intake stroke, the valve gear 8 opens and closes only the exhaust valve 4 in the exhaust stroke. In the scavenging intake stroke next to the exhaust stroke, the valve gear 8 opens and closes only the intake scavenging valve 5a. In the scavenging exhaust stroke after that, the valve gear 8 opens and closes only the exhaust scavenging valve 5b.

More specifically, the valve gear 8 operates the intake valve 3 and the exhaust valve 4 so as to execute the intake stroke, the compression stroke, the expansion stroke, and the exhaust stroke, in this order, in a state in which the scavenging valve 5 (intake scavenging valve 5a and exhaust scavenging valve 5b) is closed. In addition, the valve gear 8 operates only the scavenging valve 5 in a state in which the intake valve 3 and the exhaust valve 4 are closed so as to execute the scavenging intake stroke and the scavenging exhaust stroke, in this order, following the exhaust stroke.

In the thus configured six-stroke cycle engine 1 including the scavenging stroke, the scavenging valve 5 (intake scavenging valve 5a) opens in the scavenging intake stroke, and fresh air is inhaled from the intake passage 9 on the upstream side of the throttle valve 11 into the cylinder 2 via the scavenging passage 22 (intake scavenging passage 22a). In the scavenging exhaust stroke, the air in the cylinder 2 is returned to the intake passage 9 on the upstream side of the throttle valve 11 via the scavenging passage 22 (exhaust scavenging passage 22b).

The resistance generated when air flows through the scavenging passage 22 is much smaller than the resistance generated when air flows through the intake passage 9 and the throttle valve 11. For this reason, the six-stroke cycle engine 1 reduces pumping loss in the scavenging intake stroke. In the scavenging exhaust stroke, the air in the cylinder 2 is returned to the intake passage 9 via the scavenging passage 22 (exhaust scavenging passage 22b). For this reason, the fresh air is not discharged to the exhaust passage 15 in the scavenging exhaust stroke.

Hence, according to the present preferred embodiment, it is possible to provide a six-stroke cycle engine configured to reduce pumping loss while preventing fresh air from being discharged to the exhaust passage 15 in the scavenging exhaust stroke.

In the six-stroke cycle engine 1 including the scavenging stroke, the cylinder 2 is cooled in the scavenging stroke. For this reason, the compression ratio is preferably made high, the ignition timing is preferably advanced, and the intake volumetric efficiency is preferably raised. It is therefore possible to improve the output and fuel efficiency. According to the present preferred embodiment, since the six-stroke cycle engine 1 including these effects reduces pumping loss in the scavenging stroke, as described above, the output and fuel efficiency is further improved.

The scavenging valve 5 according to the present preferred embodiment includes the intake scavenging valve 5a that opens in the scavenging intake stroke and closes in the scavenging exhaust stroke, and the exhaust scavenging valve 5b that closes in the scavenging intake stroke and opens in the scavenging exhaust stroke. The scavenging port 21 according to the present preferred embodiment includes the scavenging intake port 21a to be opened and closed by the intake scavenging valve 5a, and the scavenging exhaust port 21b to be opened and closed by the exhaust scavenging valve 5b.

For this reason, according to the present preferred embodiment, fresh air is discharged from the scavenging intake port 21a to the scavenging exhaust port 21b via the cylinder 2 by executing the scavenging intake stroke and the scavenging exhaust stroke. Hence, the cylinder 2 is efficiently cooled due to the following two reasons. As the first reason, fresh air flows across the cylinder 2 from one end to the other end in the radial direction, and therefore contacts the entire area of the cylinder 2. As the second reason, fresh air flows near the exhaust port 14 having the highest temperature, and therefore lowers the temperature of the exhaust port 14 as well.

Hence, according to the present preferred embodiment, it is possible to provide a six-stroke cycle engine configured to further lower the temperature of the cylinder 2.

Second Preferred Embodiment

Figure 3:
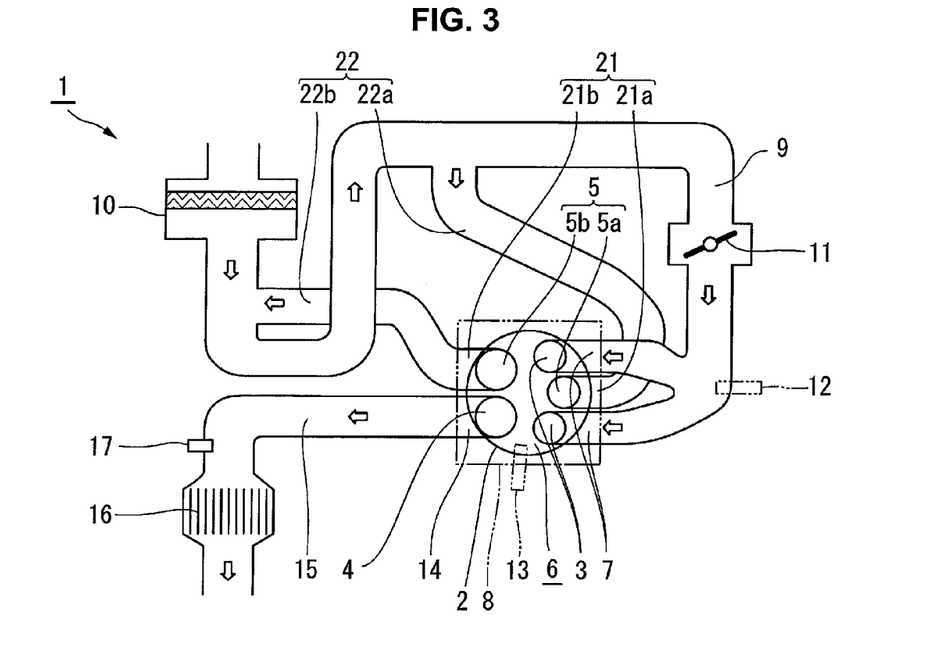
FIG. 3 is a block diagram showing a six-stroke cycle engine according to a second preferred embodiment of the present invention.

When a scavenging valve includes an intake scavenging valve and an exhaust scavenging valve, the arrangement shown in FIG. 3 may be used. The same reference numerals as described with reference to FIGS. 1 and 2 denote the same or similar elements in FIG. 3, and a detailed description thereof will appropriately be omitted.

A six-stroke cycle engine 1 shown in FIG. 3 includes two intake valves 3. The intake valves 3 are provided on both sides of an intake scavenging valve 5a. When the arrangement using two intake valves 3 is used, as shown in FIG. 3, the intake air volume increases. It is therefore possible to further improve the output.

Third Preferred Embodiment

Figure 4:
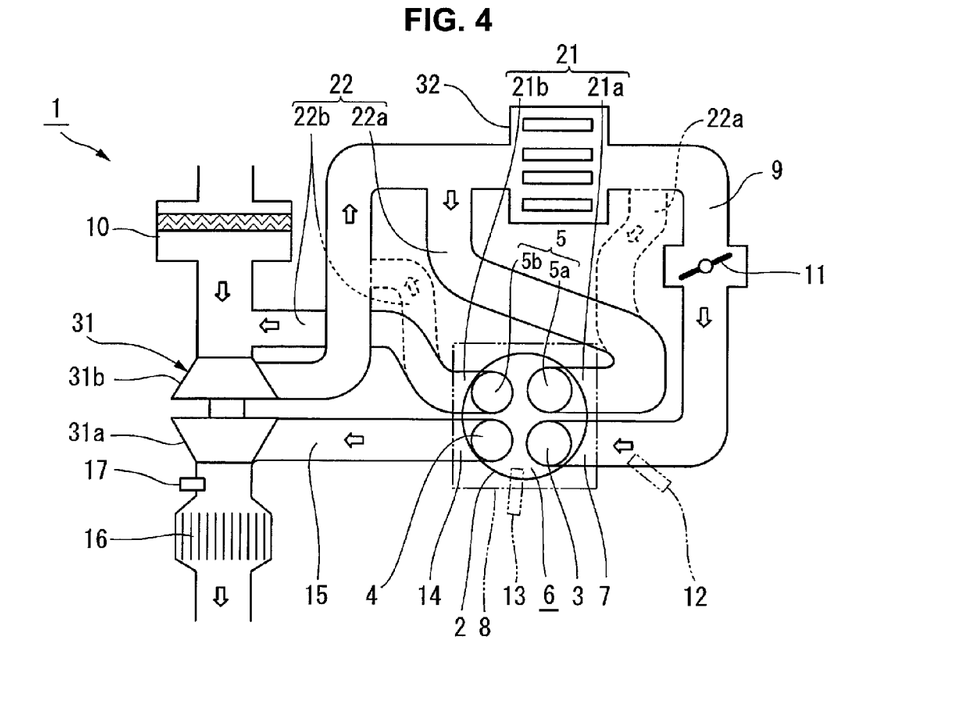
FIG. 4 is a block diagram showing a six-stroke cycle engine according to a third preferred embodiment of the present invention.
Figure 5:
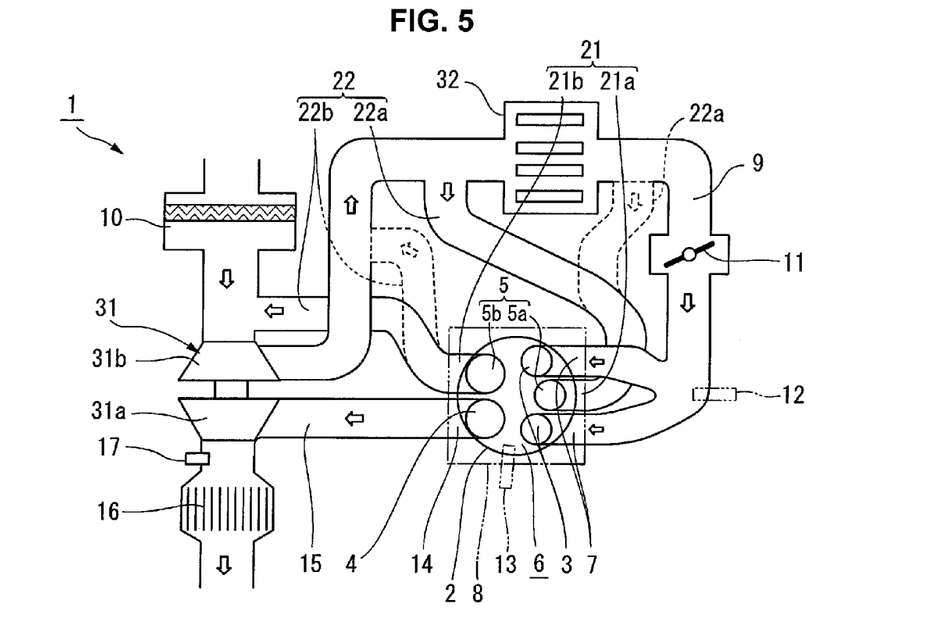
FIG. 5 is a block diagram showing another example of the six-stroke cycle engine according to the third preferred embodiment of the present invention.

A six-stroke cycle engine whose scavenging valve includes an intake scavenging valve and an exhaust scavenging valve may include a supercharger, as shown in FIGS. 4 and 5. The same reference numerals as described with reference to FIGS. 1 to 3 denote the same or similar members in FIGS. 4 an 5, and a detailed description thereof will appropriately be omitted.

The six-stroke cycle engine 1 shown in FIG. 4 includes a supercharger 31 in the six-stroke cycle engine 1 shown in FIG. 1. The six-stroke cycle engine 1 shown in FIG. 5 includes the supercharger 31 in the six-stroke cycle engine 1 shown in FIG. 3. The supercharger 31 according to the present preferred embodiment is preferably a turbocharger including a turbine 31a on the side of an exhaust passage 15, and a compressor 31b on the side of an intake passage 9. The intake passage 9 according to the present preferred embodiment includes an intercooler 32 on the upstream side of a throttle valve 11. The intercooler 32 cools intake air.

Referring to FIGS. 4 and 5, the other end of an intake scavenging passage 22a including one end defined by a scavenging intake port 21a is connected to the intake passage 9 upstream of the intercooler 32, as indicated by the solid lines in FIGS. 4 and 5. The other end of the intake scavenging passage 22a is connected to the intake passage 9 downstream from the intercooler 32, as indicated by the broken lines in FIGS. 4 and 5.

Referring to FIGS. 4 and 5, the other end of an exhaust scavenging passage 22b including one end defined by a scavenging exhaust port 21b is connected to the intake passage 9 upstream from the supercharger 31, as indicated by the solid lines in FIGS. 4 and 5. The other end of the exhaust scavenging passage 22b is connected to the intake passage 9 downstream from the supercharger 31, as indicated by the broken lines in FIGS. 4 and 5.

According to the preferred embodiments shown in FIGS. 4 and 5, since the supercharger 31 supercharges the intake air, it is possible to provide a six-stroke cycle engine that obtains a higher output.

When the present preferred embodiment is used, since fresh air cooled by the intercooler 32 is supplied into a cylinder 2 in the scavenging intake stroke by connecting the upstream end of the intake scavenging passage 22a to the downstream side of the intercooler 32 in the intake passage 9, a large cylinder cooling effect is obtained. In this case, when the downstream end of the exhaust scavenging passage 22b is connected to the intake passage 9 upstream from the supercharger 31, the pressure difference between the scavenging intake port 21a and the scavenging exhaust port 21b becomes large. This causes air to readily return to the intake passage 9.

Fourth Preferred Embodiment

A fourth preferred embodiment of a six-stroke cycle engine including a scavenging stroke will be described in detail with reference to FIGS. 6 and 7. The same reference numerals as described with reference to FIGS. 1 and 2 denote the same or similar members in FIGS. 6 and 7, and a detailed description thereof will appropriately be omitted.

Figure 6:
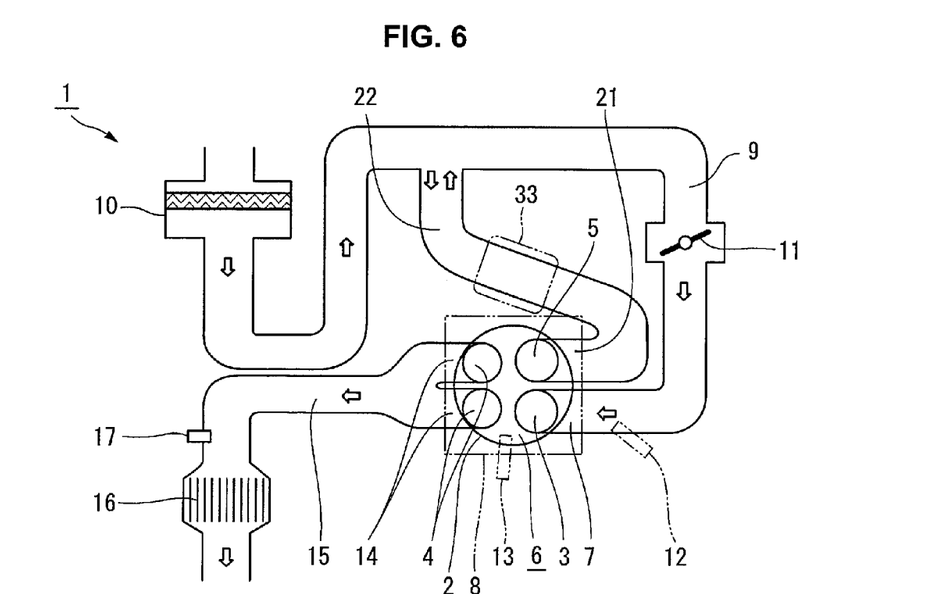
FIG. 6 is a block diagram showing the arrangement of a six-stroke cycle engine according to a fourth preferred embodiment of the present invention.
Figure 7:
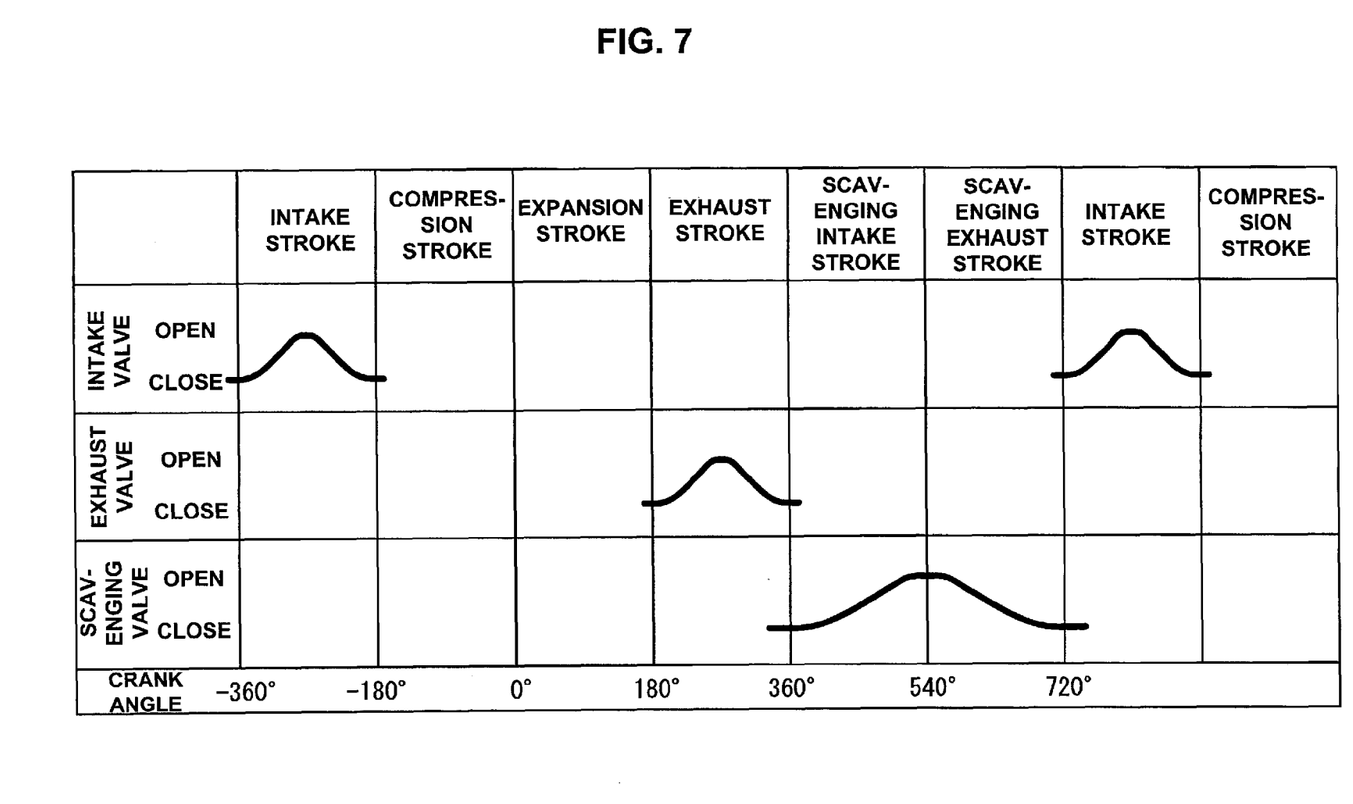
FIG. 7 is a timing chart showing the valve opening and closing timings of the six-stroke cycle engine according to the fourth preferred embodiment of the present invention.

A cylinder 2 of a six-stroke cycle engine 1 shown in FIG. 6 includes one intake valve 3, two exhaust valves 4, and one scavenging valve 5. The scavenging valve 5 is configured to open in the scavenging intake stroke and the scavenging exhaust stroke and to close in the remaining strokes in order to perform both scavenging intake and scavenging exhaust. The scavenging valve 5 is located at a position adjacent to the intake valve 3 in the axial direction of a crankshaft (not shown).

A scavenging port 21 shown in FIG. 6 is arranged such that a scavenging inlet also serves as a scavenging outlet. More specifically, a scavenging passage 22 according to the present preferred embodiment includes a scavenging port 21 communicating with the upstream side of a throttle valve 11 in an intake passage 9. A cooler 33 is preferably provided in the scavenging passage 22, as indicated by the alternate long and two short dashed line in FIG. 6. The cooler 33 cools air flowing through the scavenging passage 22.

In the six-stroke cycle engine 1 according to the present preferred embodiment, fresh air is supplied from the one scavenging port 21 into the cylinder 2 in the scavenging intake stroke, and discharged from the cylinder 2 to the scavenging port 21 in the scavenging exhaust stroke. For this reason, according to the six-stroke cycle engine 1 of the present preferred embodiment, the number of scavenging passages is smaller than in a case where two scavenging passages (intake scavenging passage 22a and exhaust scavenging passage 22b) are used, as described above in the first to third preferred embodiments, and the structure of the scavenging passage is simplified. Hence, according to the present preferred embodiment, it is possible to provide a six-stroke cycle engine that is easy to manufacture.

The scavenging passage 22 according to the present preferred embodiment is provided on the intake side of the cylinder 2. For this reason, there is a high degree of flexibility in designing the exhaust side of the cylinder 2 without restriction on the scavenging passage 22.

When the cooler 33 is provided in the scavenging passage 22, fresh air cooled by the cooler 33 is supplied into the cylinder 2 in the scavenging intake stroke. This further enhances the cylinder cooling effect by the scavenging intake. In addition, since fresh air (scavenging air) discharged to the scavenging passage 22 in the scavenging exhaust stroke is cooled by the cooler 33, heat from a combustion chamber 6 is transmitted to the cooler 33 via the fresh air (scavenging air). As a result, the cold fresh air (scavenging air) returns to the intake passage 9. This improves the intake volumetric efficiency in the intake stroke.

Fifth Preferred Embodiment

Figure 8:
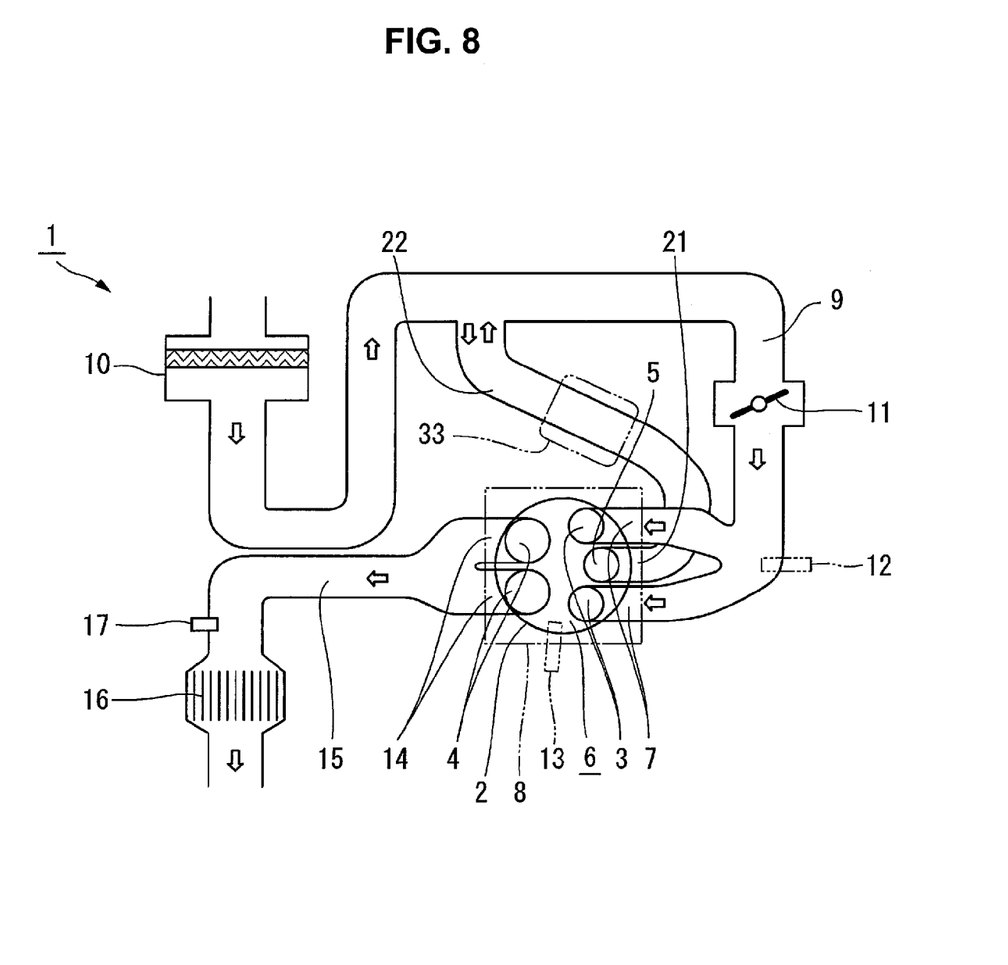
FIG. 8 is a block diagram showing a six-stroke cycle engine according to a fifth preferred embodiment of the present invention.

When an intake scavenging passage and an exhaust scavenging passage are defined by one common scavenging passage, an intake valve and an intake port are preferably configured as shown in FIG. 8. The same reference numerals as described with reference to FIGS. 1 to 3 and 6 denote the same or similar members in FIG. 8, and a detailed description thereof will appropriately be omitted.

A six-stroke cycle engine 1 shown in FIG. 8 includes two intake valves 3. The intake valves 3 are provided on both sides of a scavenging valve 5. When the arrangement using the two intake valves 3 is used, as shown in FIG. 8, the intake air volume increases. It is therefore possible to further improve the output.

Even when the present preferred embodiment is used, the same effects as in the fourth preferred embodiment are obtained by providing a cooler 33 in a scavenging passage 22.

Sixth Preferred Embodiment

Figure 9:
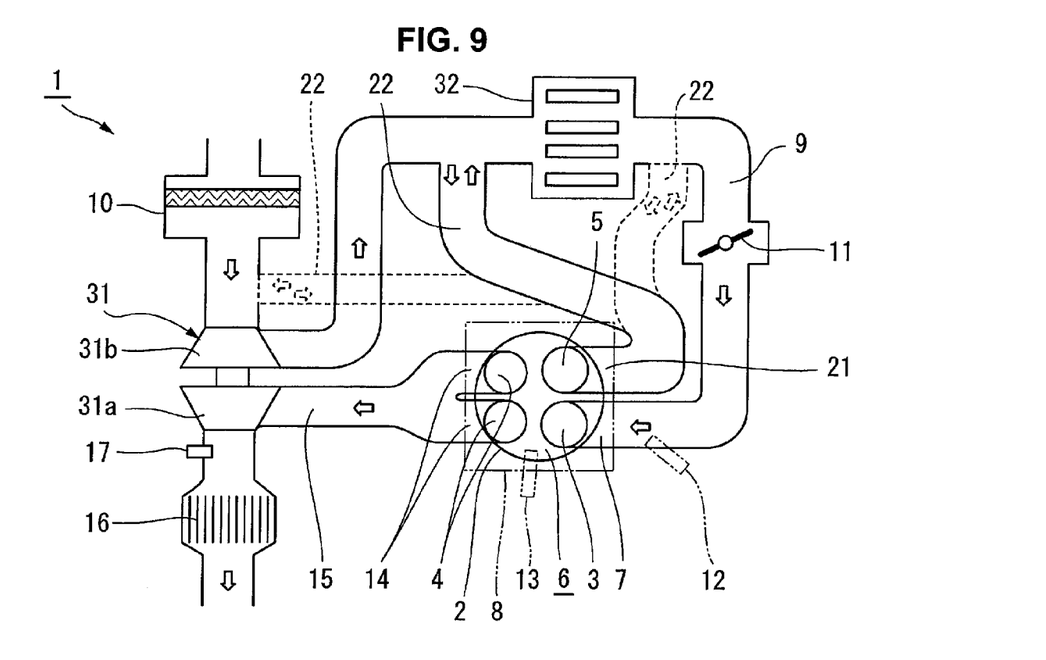
FIG. 9 is a block diagram showing a six-stroke cycle engine according to the sixth preferred embodiment of the present invention.
Figure 10:
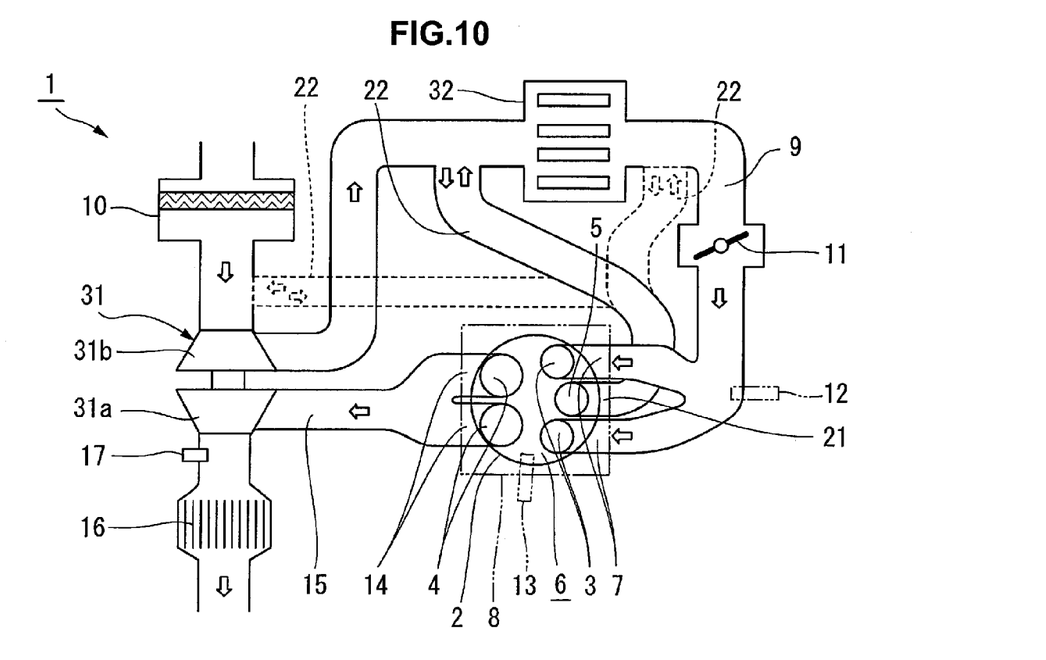
FIG. 10 is a block diagram showing another example of the six-stroke cycle engine according to the sixth preferred embodiment of the present invention.

Even when an intake scavenging passage and an exhaust scavenging passage are defined by one common scavenging passage, a supercharger may be provided, as shown in FIGS. 9 and 10. The same reference numerals as described with reference to FIGS. 1 to 8 denote the same or similar members in FIGS. 9 and 10, and a detailed description thereof will appropriately be omitted.

The six-stroke cycle engine 1 shown in FIG. 9 includes a supercharger 31 in the six-stroke cycle engine 1 shown in FIG. 6. The six-stroke cycle engine 1 shown in FIG. 10 provides the supercharger 31 in the six-stroke cycle engine 1 shown in FIG. 8. An intake passage 9 according to the present preferred embodiment includes an intercooler 32 configured to cool intake air on the upstream side of a throttle valve 11.

The other end of a scavenging passage 22 having one end defined by a scavenging port 21 shown in FIGS. 9 and 10 is connected to the intake passage 9 upstream of the intercooler 32, as indicated by the solid lines in FIGS. 9 and 10. The other end of the scavenging passage 22 is connected to the intake passage 9 downstream from the intercooler 32 or upstream of a compressor 31b, as indicated by the broken lines in FIGS. 9 and 10.

According to the present preferred embodiment, since the supercharger 31 supercharges the intake air, it is possible to provide a six-stroke cycle engine that obtains a higher output.

When the present preferred embodiment is used, since fresh air cooled by the intercooler 32 is supplied into a cylinder 2 in the scavenging intake stroke by connecting the upstream end of the scavenging passage 22 to the downstream side of the intercooler 32 in the intake passage 9, a large cylinder cooling effect is obtained.

Seventh Preferred Embodiment

Figure 11:
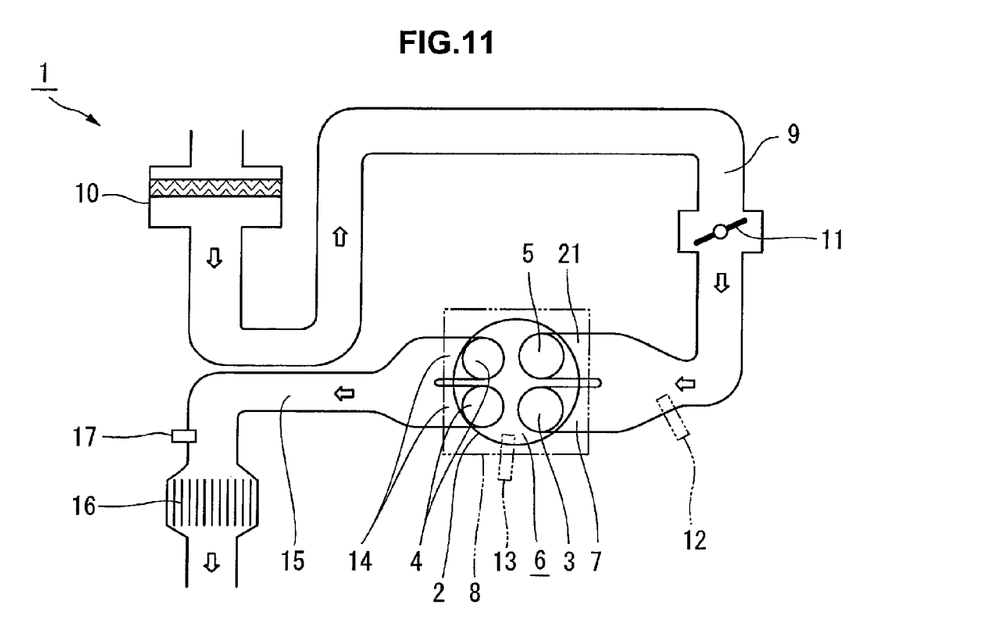
FIG. 11 is a block diagram showing a six-stroke cycle engine according to a seventh preferred embodiment of the present invention.

When a scavenging valve opens in the scavenging intake stroke and the scavenging exhaust stroke and closes in the remaining strokes in order to both scavenge intake air and scavenge exhaust gas (case shown in FIG. 7), an intake port and a scavenging port are preferably configured as shown in FIG. 11. The same reference numerals as described with reference to FIGS. 1 to 3 and 6 denote the same or similar members in FIG. 11, and a detailed description thereof will appropriately be omitted.

A scavenging valve 5 of the six-stroke cycle engine 1 shown in FIG. 11 is configured to open in the scavenging intake stroke and the scavenging exhaust stroke and to close in the remaining strokes in order to both scavenge intake air and scavenge exhaust gas. A scavenging port 21 shown in FIG. 11 defines the downstream end of an intake passage 9 together with an intake port 7. For this reason, the scavenging passage is absent, and the arrangement is simplified as compared to the above-described fourth to sixth preferred embodiments in which a scavenging passage and an intake passage (scavenging passage 22 and intake passage 9) are used. Hence, according to the present preferred embodiment, it is possible to provide a six-stroke cycle engine that is easy to manufacture.

The scavenging valve 5 according to the present preferred embodiment is located at a position adjacent to an intake valve 3 in the axial direction of a crankshaft. For this reason, the scavenging port 21 preferably has the same shape as the intake port 7. That is, the six-stroke cycle engine 1 according to the present preferred embodiment is implemented only by changing the valve mechanism of an existing four-stroke engine, and is therefore easily manufactured.

Eighth Preferred Embodiment

Figure 12:
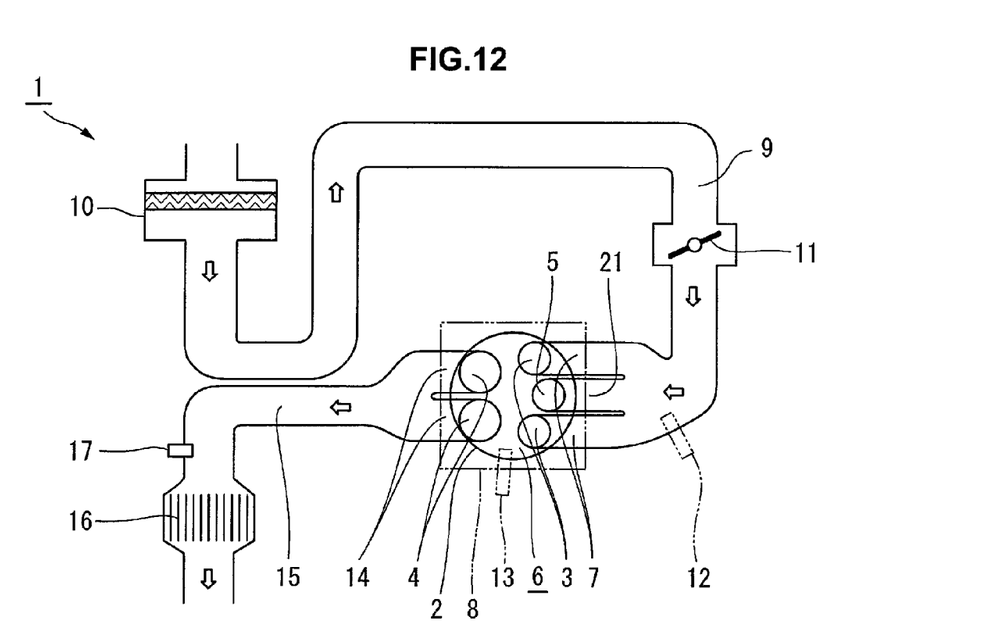
FIG. 12 is a block diagram showing a six-stroke cycle engine according to an eighth preferred embodiment of the present invention.

When a scavenging port defines the downstream end of an intake passage together with an intake port, an intake valve and the intake port are preferably configured as shown in FIG. 12. The same reference numerals as described with reference to FIGS. 1 to 3 and 6 denote the same or similar members in FIG. 12, and a detailed description thereof will appropriately be omitted.

A scavenging valve 5 shown in FIG. 12 is configured to open in the scavenging intake stroke and the scavenging exhaust stroke and to close in the remaining strokes in order to both scavenge intake air and scavenge exhaust gas. A scavenging port 21 to be opened and closed by the scavenging valve 5 defines the downstream end of an intake passage 9 together with an intake port 7.

A six-stroke cycle engine 1 shown in FIG. 12 includes two intake valves 3. The intake valves 3 are provided on both sides of the scavenging valve 5. When the arrangement using the two intake valves 3 is used, as shown in FIG. 12, the intake air volume increases. It is therefore possible to further improve the output.

Ninth Preferred Embodiment

Figure 13:
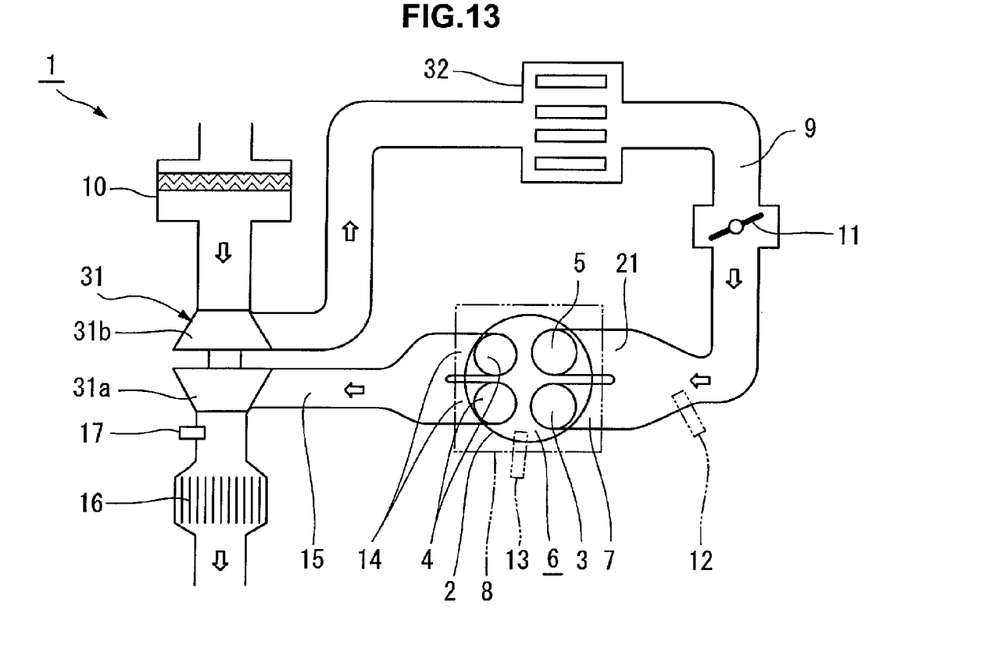
FIG. 13 is a block diagram showing a six-stroke cycle engine according to a ninth preferred embodiment of the present invention.
Figure 14:
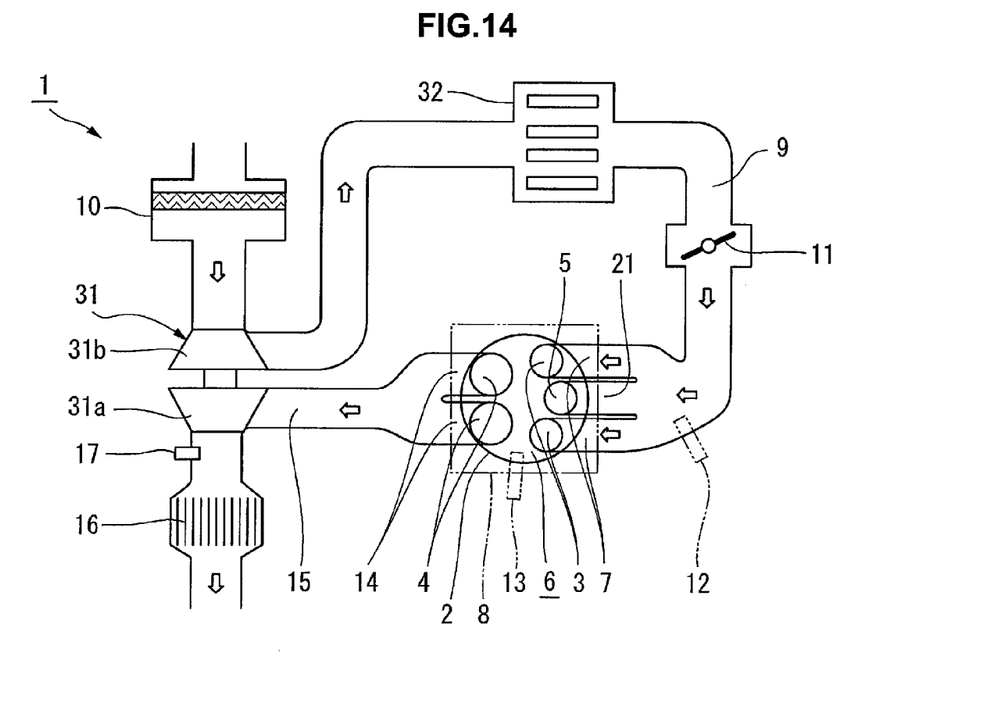
FIG. 14 is a block diagram showing another example of the six-stroke cycle engine according to the ninth preferred embodiment of the present invention.

Even when a scavenging port defines the downstream end of an intake passage together with an intake port, a supercharger may be provided, as shown in FIGS. 13 and 14. The same reference numerals as described with reference to FIGS. 1 to 12 denote the same or similar members in FIGS. 13 and 14, and a detailed description thereof will appropriately be omitted.

The six-stroke cycle engine 1 shown in FIG. 13 includes a supercharger 31 in the six-stroke cycle engine 1 shown in FIG. 11. The six-stroke cycle engine 1 shown in FIG. 14 includes the supercharger 31 in the six-stroke cycle engine 1 shown in FIG. 12. An intake passage 9 according to the present preferred embodiment includes an intercooler 32 configured to cool intake air on the upstream side of a throttle valve 11.

According to the present preferred embodiment, since the supercharger 31 supercharges the intake air, it is possible to provide a six-stroke cycle engine that obtains a high output.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A six-stroke cycle engine including a scavenging stroke, comprising:
    an intake passage including a throttle valve and a downstream end defined by an intake port open to a combustion chamber;
    an exhaust passage including a catalyst and an upstream end defined by an exhaust port open to the combustion chamber;
    a scavenging passage including a first end defined by a scavenging port open to the combustion chamber and a second end connected to the intake passage upstream of the throttle valve;
    an intake valve configured to open and close the intake port;
    an exhaust valve configured to open and close the exhaust port;
    a scavenging valve configured to open and close the scavenging port; and
    a valve gear configured to operate the intake valve and the exhaust valve so that an intake stroke, a compression stroke, an expansion stroke, and an exhaust stroke are executed, in this order, in a state in which the scavenging valve is closed, and to operate only the scavenging valve in a state in which the intake valve and the exhaust valve are closed so that a scavenging intake stroke and a scavenging exhaust stroke are executed, in this order, following the exhaust stroke.

2. The six-stroke cycle engine according to claim 1, wherein the scavenging valve includes an intake scavenging valve that opens in the scavenging intake stroke and closes in the scavenging exhaust stroke, and an exhaust scavenging valve that closes in the scavenging intake stroke and opens in the scavenging exhaust stroke; and
    the scavenging port includes a scavenging intake port configured to be opened and closed by the intake scavenging valve, and a scavenging exhaust port configured to be opened and closed by the exhaust scavenging valve.

3. The six-stroke cycle engine according to claim 2, wherein the intake passage is configured to receive fresh air from a supercharger, and an intercooler upstream of the throttle valve;
    the second end of the scavenging passage, which includes an end defined by the scavenging intake port, is connected to the intake passage upstream or downstream of the intercooler; and
    the second end of the scavenging passage, which includes an end defined by the scavenging exhaust port, is connected to the intake passage upstream or downstream of the supercharger.

4. The six-stroke cycle engine according to claim 1, wherein the scavenging valve is configured to open in the scavenging intake stroke and the scavenging exhaust stroke, and to close in remaining strokes in order to both scavenge intake air and scavenge exhaust gas; and
    the scavenging port defines both a scavenging inlet and a scavenging outlet.

5. The six-stroke cycle engine according to claim 4, wherein the scavenging passage includes a cooler configured to cool air flowing through the scavenging passage.

6. The six-stroke cycle engine according to claim 4, wherein the intake passage is configured to send fresh air from a supercharger, and includes an intercooler upstream of the throttle valve; and
    the second end of the scavenging passage is connected to the intake passage upstream or downstream of the intercooler.

* * * * *